US012639927B2

(12) United States Patent
Youn et al.

(10) Patent No.: US 12,639,927 B2
(45) Date of Patent: May 26, 2026

(54) ELECTRONIC DEVICE FOR IMPROVING THE EXPLAINABILITY OF SATELLITE IMAGE

(71) Applicant: SAMSUNG ELECTRONICS CO., LTD., Suwon-si (KR)

(72) Inventors: Chan-Hyun Youn, Daejeon (KR); Taewoo Kim, Daejeon (KR); Changha Lee, Daejeon (KR); Minsu Jeon, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 268 days.

(21) Appl. No.: 18/377,649

(22) Filed: Oct. 6, 2023

(65) Prior Publication Data
US 2024/0135682 A1 Apr. 25, 2024

(30) Foreign Application Priority Data

Oct. 7, 2022 (KR) ........................ 10-2022-0128830
Dec. 7, 2022 (KR) ........................ 10-2022-0169769

(51) Int. Cl.
*G06V 10/771* (2022.01)
*G06V 10/764* (2022.01)
*G06V 20/13* (2022.01)

(52) U.S. Cl.
CPC .......... *G06V 10/771* (2022.01); *G06V 10/764* (2022.01); *G06V 20/13* (2022.01)

(58) Field of Classification Search
CPC ..... G06V 10/771; G06V 10/764; G06V 20/13
See application file for complete search history.

(56) References Cited

U.S. PATENT DOCUMENTS 10,699,129 B1 * 6/2020 Jiang .................... G06V 10/454
11,049,217 B2 6/2021 Wang et al.
(Continued)

FOREIGN PATENT DOCUMENTS

KR          10-1579275 B1     12/2015
KR     10-2021-0024126 A      3/2021

OTHER PUBLICATIONS

Guo, Yiyou, et al. "Global-local attention network for aerial scene classification." IEEE Access 7 (2019): 67200-67212. (Year: 2019).*
(Continued)

*Primary Examiner* — Utpal D Shah
(74) *Attorney, Agent, or Firm* — Sughrue Mion, PLLC

(57) ABSTRACT

An electronic device includes a memory configured to store at least one instruction; and at least one processor configured to execute the at least one instruction to: input first data to a first artificial intelligence model including a plurality of convolution blocks sequentially connected with a pooling layer interposed therebetween to obtain a plurality of feature maps that are output by corresponding ones of the plurality of convolution blocks, input the first data and the plurality of feature maps to a second artificial intelligence model including a plurality of local attention blocks sequentially connected to obtain a plurality of attention maps that are output by corresponding ones of the plurality of local attention blocks, output an amplified feature map by amplifying a region corresponding to a last attention map among the plurality of attention maps in a last feature map among the plurality of feature maps, and input the amplified feature map to a classifier to output a classification result for the first data.

18 Claims, 12 Drawing Sheets

(56) References Cited

U.S. PATENT DOCUMENTS

| | | | | |
|---|---|---|---|---|
| 11,256,989 | B2 | 2/2022 | Dalli et al. | |
| 11,429,815 | B2 | 8/2022 | Lam et al. | |
| 11,443,069 | B2 | 9/2022 | Liu et al. | |
| 11,915,500 | B2 * | 2/2024 | Zhou | G06N 3/08 |
| 2017/0262705 | A1 * | 9/2017 | Li | G06N 3/044 |
| 2019/0303404 | A1 | 10/2019 | Amer et al. | |
| 2020/0151448 | A1 * | 5/2020 | Lin | G06N 3/08 |
| 2021/0365724 | A1 * | 11/2021 | Lee | G06T 7/73 |
| 2021/0406582 | A1 * | 12/2021 | Wang | G06F 18/214 |
| 2022/0076035 | A1 * | 3/2022 | Wu | G06V 30/194 |
| 2022/0300771 | A1 * | 9/2022 | Chen | G06F 18/211 |
| 2022/0307861 | A1 * | 9/2022 | Konishi | G01C 21/3822 |
| 2023/0026787 | A1 * | 1/2023 | Lee | G06V 10/454 |
| 2023/0153380 | A1 * | 5/2023 | Chi | G06N 3/082 |
| | | | | 382/157 |
| 2023/0260279 | A1 * | 8/2023 | Du | G06V 10/58 |
| | | | | 382/157 |
| 2024/0203108 | A1 * | 6/2024 | Wang | G06V 10/806 |

OTHER PUBLICATIONS

Woo, Sanghyun, et al. "Cbam: Convolutional block attention module." Proceedings of the European conference on computer vision (ECCV). 2018. (Year: 2018).*

Communication issued Feb. 23, 2024 by the European Patent Office in European Patent Application No. 23202140.2.

Jaegle, Andrew et al., "Perceiver: General Perception with Iterative Attention", Proceedings of the 38th International Conference on Machine Learning, PMLR 139, 2021 arXiv:2103.03206v1 [cs.CV], Mar. 4, 2021, XP081905825. (16 pages total).

Papoutsis, Ioannis et al., "Benchmarking and scaling of deep learning models for land cover image classification", arXiv:2111.09451v3 [cs.CV], Sep. 14, 2022, XP091317412. (25 pages total).

Dosovitskiy, Alexey et al., "An Image is Worth 16×16 Words: Transformers for Image Recognition at Scale", arXiv:2010.11929v2 [cs.CV], ICLR, Jun. 3, 2021. (22 pages total).

Wu, Haiping et al., "CvT: Introducing Convolutions to Vision Transformers", 2021 IEEE/CVF International Conference on Computer Vision (ICCV), IEEE, Oct. 10, 2021, pp. 22-31, XP034092703. (10 pages total).

Guiffrida et al., "The ϕ-Sat-1 Mission: The First On-Board Deep Neural Network Demonstrator for Satellite Earth Observation", IEEE Transactions on Geoscience and Remote Sensing, Feb. 14, 2022, 14 total pages, vol. 60.

Zhou et al., "Learning Deep Features for Discriminative Localization", 2016 IEEE Conference on Computer Vision and Pattern Recognition (CVPR), 2016, pp. 2921-2929, doi:10.1109/CVPR.2016.319.

Selvaraju et al., "Grad-CAM: Visual Explanations from Deep Networks via Gradient-Based Localization", 2017 IEEE International Conference on Computer Vision (ICCV), 2017, pp. 618-626, doi:10.1109/ICCV.2017.74.

Fukui et al., "Attention Branch Network: Learning of Attention Mechanism for Visual Explanation", 2019 IEEE/CVF Conference on Computer Vision and Pattern Recognition (CVPR), 2019, pp. 10697-10706, doi:10.1109/CVPR.2019.01096.

Lee et al., "LFI-CAM: Learning Feature Importance for Better Visual Explanation", 2021 IEEE/CVF International Conference on Computer Vision (ICCV), 2021, pp. 1335-1343, doi:10.1109/ICCV48922.2021.00139.

Selvaraju et al., "Taking a HINT: Leveraging Explanations to Make Vision and Language Models More Grounded", 2019 IEEE/CVF International Conference on Computer Vision (ICCV), 2019, pp. 2591-2600, doi:10.1109/ICCV.2019.00268.

Dunkel et al., "Benchmarking Deep Learning Inference of Remote Sensing Imagery on the Qualcomm Snapdragon And Intel Movidius Myriad X Processors Onboard the International Space Station", IGARSS 2022—2022 IEEE International Geoscience and Remote Sensing Symposium, 2022, pp. 5301-5304, doi: 10.1109/IGARSS46834.2022.9884906.

"Snapdragon Insiders get access to Qualcomm expert Kim Koro to learn about the first ever flight on Mars", Qualcomm Technologies Inc., Jun. 25, 2021, 8 total pages, https://www.qualcomm.com/snapdragoninsiders/news-forums/snapdragon-insiders-get-access-qualcomm-expert-kim-koro-learn-about.

* cited by examiner

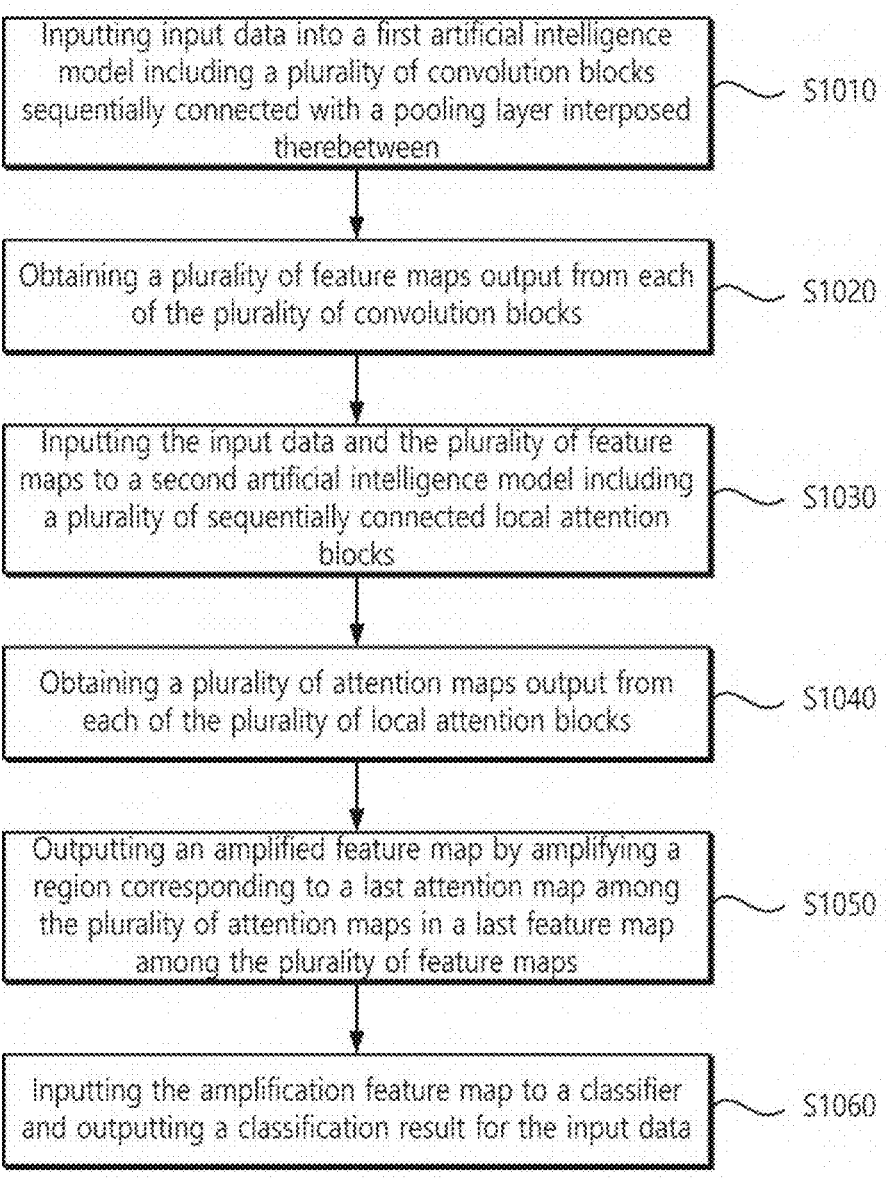

Inputting input data into a first artificial intelligence model including a plurality of convolution blocks sequentially connected with a pooling layer interposed therebetween ~ S1010

Obtaining a plurality of feature maps output from each of the plurality of convolution blocks ~ S1020

Inputting the input data and the plurality of feature maps to a second artificial intelligence model including a plurality of sequentially connected local attention blocks ~ S1030

Obtaining a plurality of attention maps output from each of the plurality of local attention blocks ~ S1040

Outputting an amplified feature map by amplifying a region corresponding to a last attention map among the plurality of attention maps in a last feature map among the plurality of feature maps ~ S1050

Inputting the amplification feature map to a classifier and outputting a classification result for the input data ~ S1060

For first local
attention block performing a pooling operation on Gray
converted data of the input data — S1110a Obtaining a weight vector for each
channel of the initial feature map — S1120a For another local
attention block Normalizing another feature map — S1110b Obtaining a weight vector for each
channel of the another feature map — S1120b

Figures 9, 10:
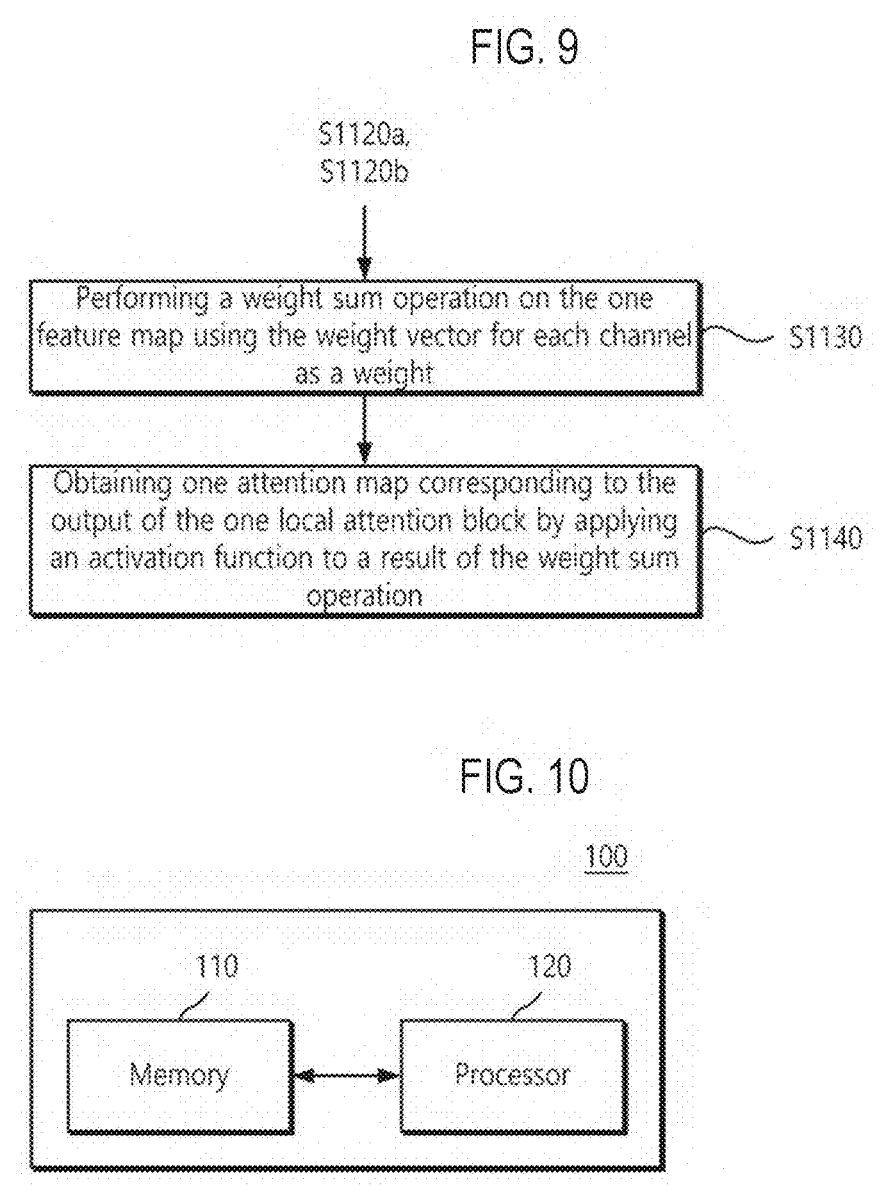

Performing a weight sum operation on the one
feature map using the weight vector for each channel — S1130
as a weight

↓

Obtaining one attention map corresponding to the
output of the one local attention block by applying — S1140
an activation function to a result of the weight sum
operation

Memory ←→ Processor

FIG. 13

ELECTRONIC DEVICE FOR IMPROVING THE EXPLAINABILITY OF SATELLITE IMAGE

CROSS-REFERENCE TO RELATED APPLICATIONS

This application claims priority under 35 U.S.C. § 119 to Korean Patent Application No. 10-2022-0128830 filed on Oct. 7, 2022, and Korean Patent Application No. 10-2022-0169769 filed on Dec. 7, 2022 in the Korean Intellectual Property Office, the disclosures of which are incorporated by reference herein in their entireties.

BACKGROUND

The present disclosure relates to an electronic device for improving the explainability of a satellite image.

With recent development of technology, as it is possible to secure large-scale data, object recognition technology through satellite images has been used in many fields. As an example, technologies for pre-processing collected satellite images by using an artificial intelligence model on the onboard of an actual satellite have been emerged.

To process an artificial intelligence model on the board of a satellite, it is important to prevent fatal errors in the artificial intelligence model. In order to improve the performance of an artificial intelligence model, labeling using visual explanation may be considered. The visual explanation refers to expressing in the form of a heat map (or saliency map) that the artificial intelligence model presents the corresponding prediction based on which part based on the prediction result of the input data in a manner that humans can understand. In the case of existing visual explanation generating techniques, only feature maps of a single top-level convolution layer are utilized.

In the case of a satellite image, the size of an object compared to a background in an image is relatively small. A convolutional neural network (CNN) including a convolutional layer includes a pooling layer for computational efficiency, but there is a risk that very small object information included in a satellite image is lost due to the pooling layer. The fact that the visual explanation is formed in the background rather than the object due to such a loss is called background bias. The background bias may lower the recognition rate of the artificial intelligence model.

SUMMARY

Example embodiments of the present disclosure provide an electronic device for improving the explainability of a satellite image.

According to an aspect of an example embodiment, an electronic device includes: a memory configured to store at least one instruction; and at least one processor configured to execute the at least one instruction to: input first data to a first artificial intelligence model including a plurality of convolution blocks sequentially connected with a pooling layer interposed therebetween to obtain a plurality of feature maps that are output by corresponding ones of the plurality of convolution blocks, input the first data and the plurality of feature maps to a second artificial intelligence model including a plurality of local attention blocks sequentially connected to obtain a plurality of attention maps that are output by corresponding ones of the plurality of local attention blocks, output an amplified feature map by amplifying a region corresponding to a last attention map among the plurality of attention maps in a last feature map among the plurality of feature maps, and input the amplified feature map to a classifier to output a classification result for the first data.

According to an aspect of an example embodiment, an operating method performed by an electronic device, includes: inputting first data to a first artificial intelligence model including a plurality of convolution blocks sequentially connected with a pooling layer interposed therebetween; obtaining a plurality of feature maps that are output by corresponding ones of the plurality of convolution blocks; inputting the first data and the plurality of feature maps to a second artificial intelligence model including a plurality of local attention blocks sequentially connected; obtaining a plurality of attention maps that are output by corresponding ones of the plurality of local attention blocks; outputting an amplified feature map by amplifying a region corresponding to a last attention map among the plurality of attention maps in a last feature map among the plurality of feature maps; and inputting the amplified feature map to a classifier to output a classification result for the first data.

According to an aspect of an example embodiment, an satellite system includes: a satellite node configured to: obtain first data corresponding to a satellite image including at least one object, output a classification result for the first data based on a first artificial intelligence model including a plurality of convolution blocks that are sequentially connected with a pooling layer interposed therebetween and a second artificial intelligence model including a plurality of local attention blocks sequentially connected; and a terrestrial node configured to: retrain the first artificial intelligence model and the second artificial intelligence model and update of model parameters, based on the retraining, to the satellite node, wherein the satellite node is further configured to: input the first data to the first artificial intelligence model to obtain a plurality of feature maps that are output by corresponding ones of the plurality of convolution blocks, input the first data and the plurality of feature maps to the second artificial intelligence model to obtain a plurality of attention maps that are output by corresponding ones of the plurality of local attention blocks, output an amplified feature map by amplifying a region corresponding to a last attention map among the plurality of attention maps in a last feature map among the plurality of feature maps, and input the amplified feature map to a classifier to output the classification result.

BRIEF DESCRIPTION OF THE DRAWINGS

The above and other aspects and features of the present disclosure will become apparent by describing in detail example embodiments thereof with reference to the accompanying drawings; in which:

FIG. 2 is a diagram illustrating in more detail an operating method of an electronic device according to an embodiment of the present disclosure;

FIG. 4 is a diagram illustrating a local attention block according to an embodiment of the present disclosure;

3

Figure 6:
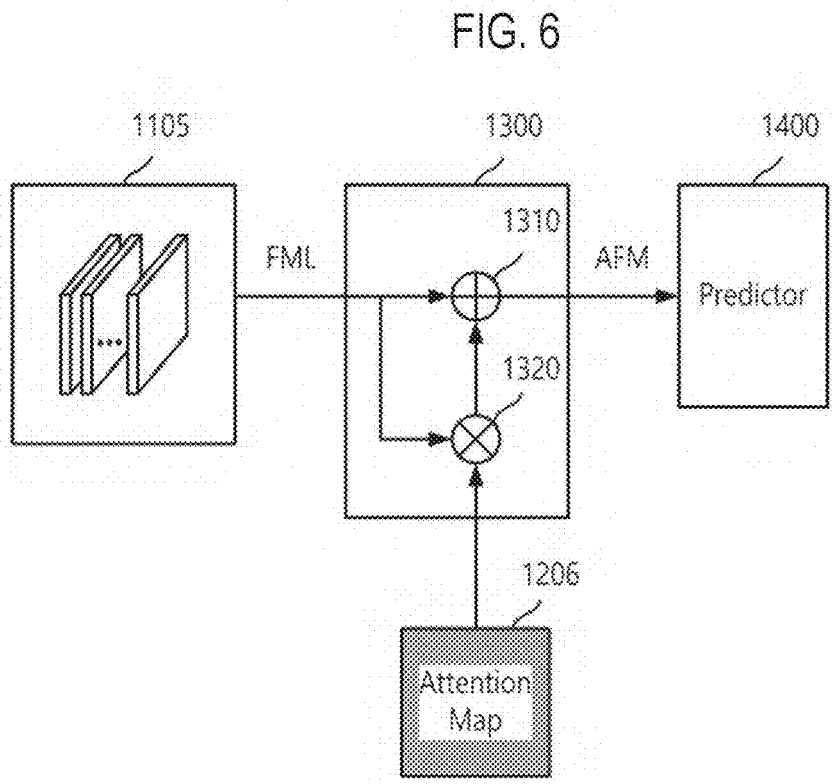
Figure 8:
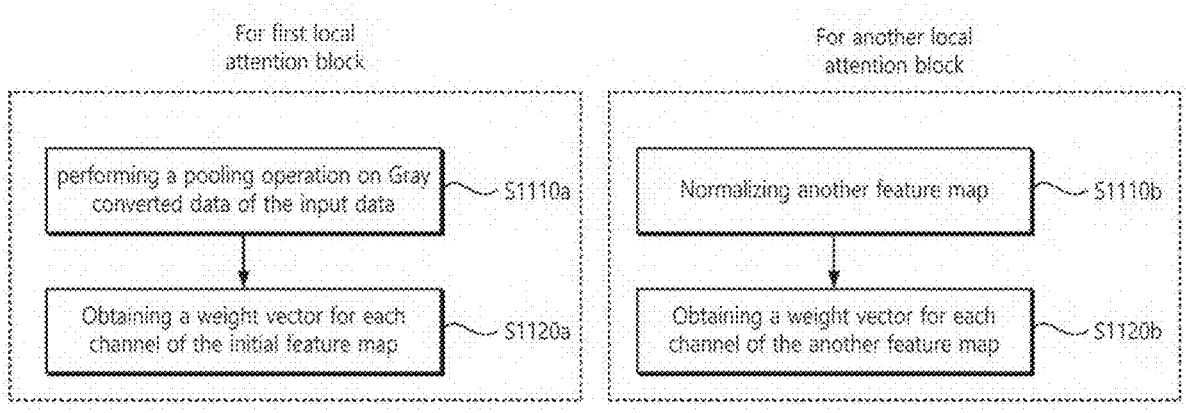
Figure 11:
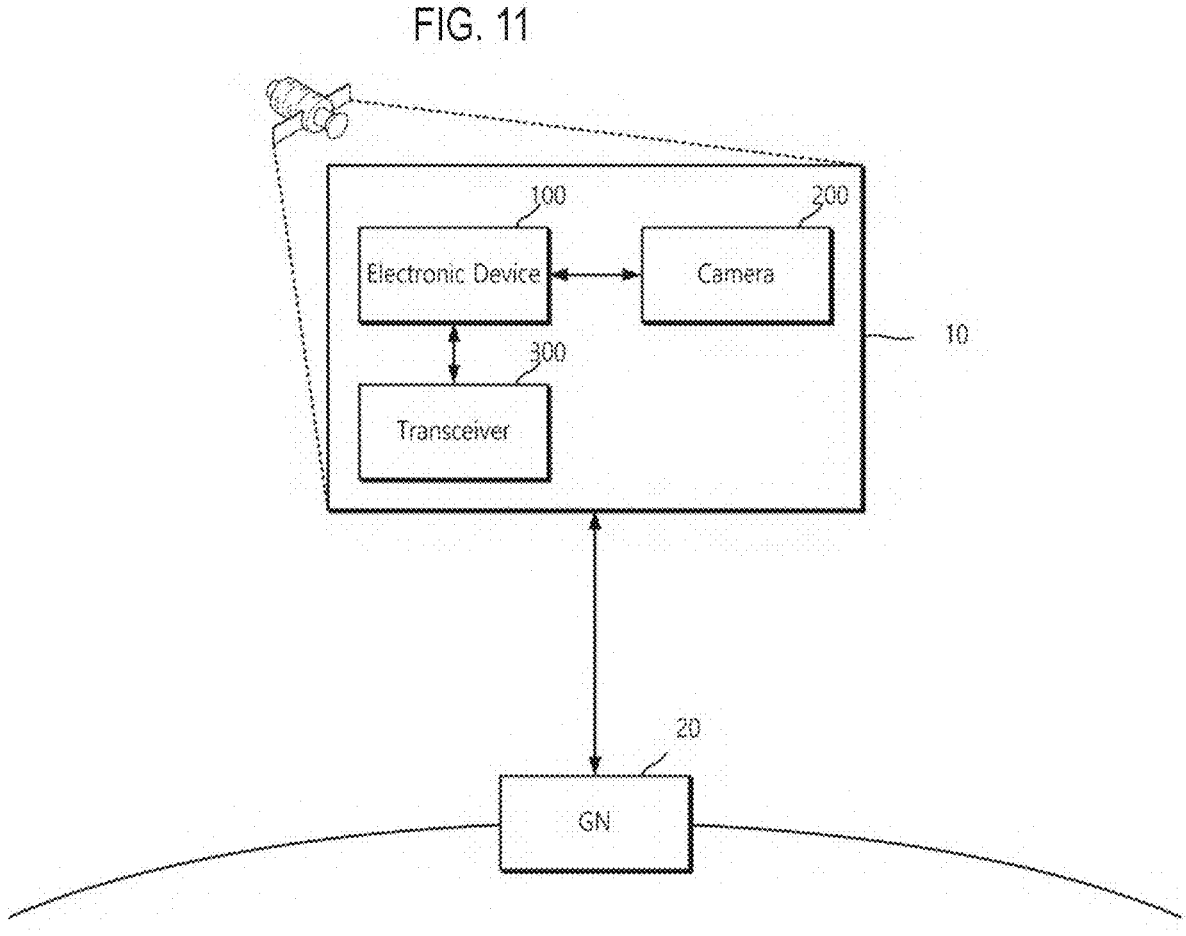
Figure 12:
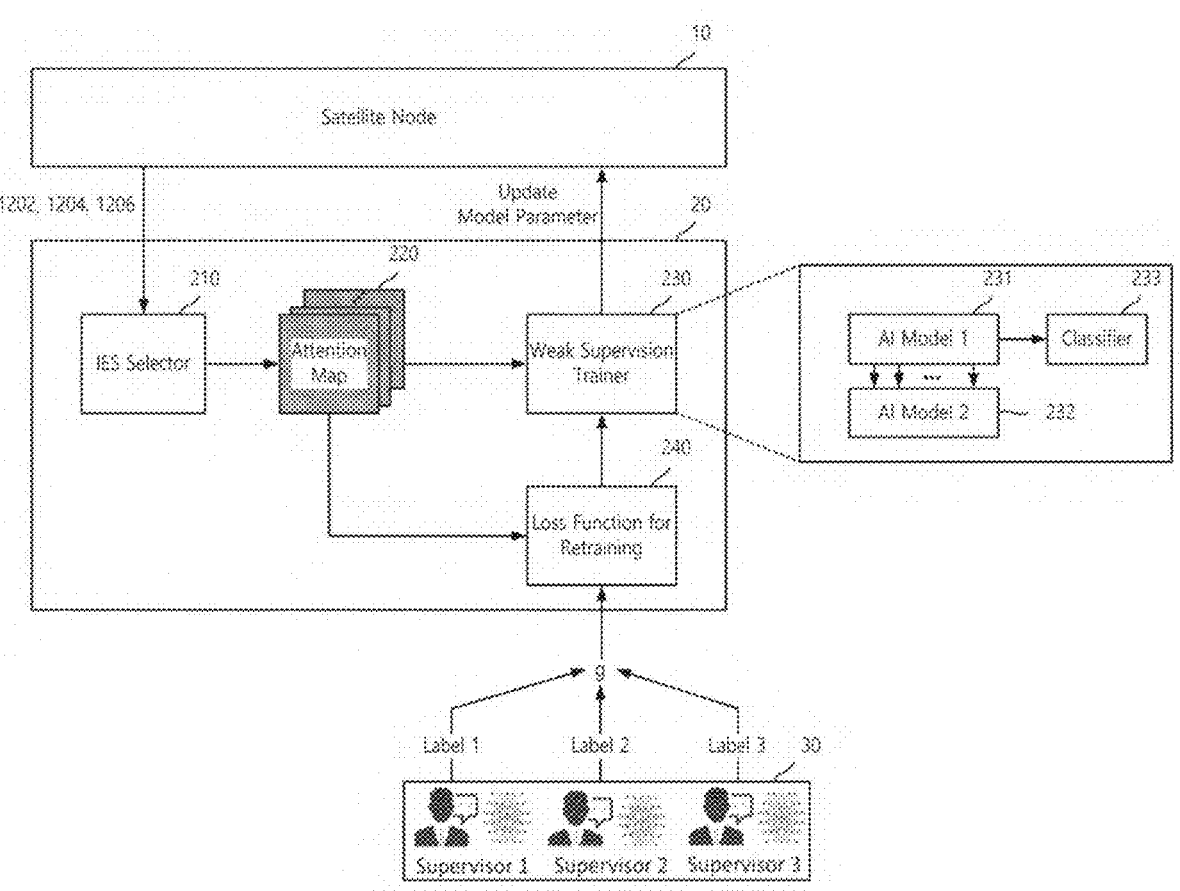

FIG. 6 is a diagram illustrating a feature refinement operation according to an embodiment of the present disclosure;

FIG. 7 is a flowchart illustrating an operating method of an electronic device according to an embodiment of the present disclosure;

FIG. 8 is a flowchart illustrating a weight vector operation according to an embodiment of the present disclosure;

FIG. 9 is a flowchart illustrating an attention map generation operation according to an embodiment of the present disclosure;

FIG. 10 is a diagram illustrating an electronic device according to an embodiment of the present disclosure;

FIG. 11 is a diagram illustrating a satellite system according to an embodiment of the present disclosure;

FIG. 12 is a diagram illustrating the operation of a terrestrial node according to an embodiment of the present disclosure; and FIG. 13 is a flowchart illustrating an operating method of a terrestrial node according to an embodiment of the present disclosure.

DETAILED DESCRIPTION

Hereinafter, example embodiments of the present disclosure will be described clearly and in detail so that those skilled in the art can easily carry out embodiments of the present disclosure.

Figure 1:
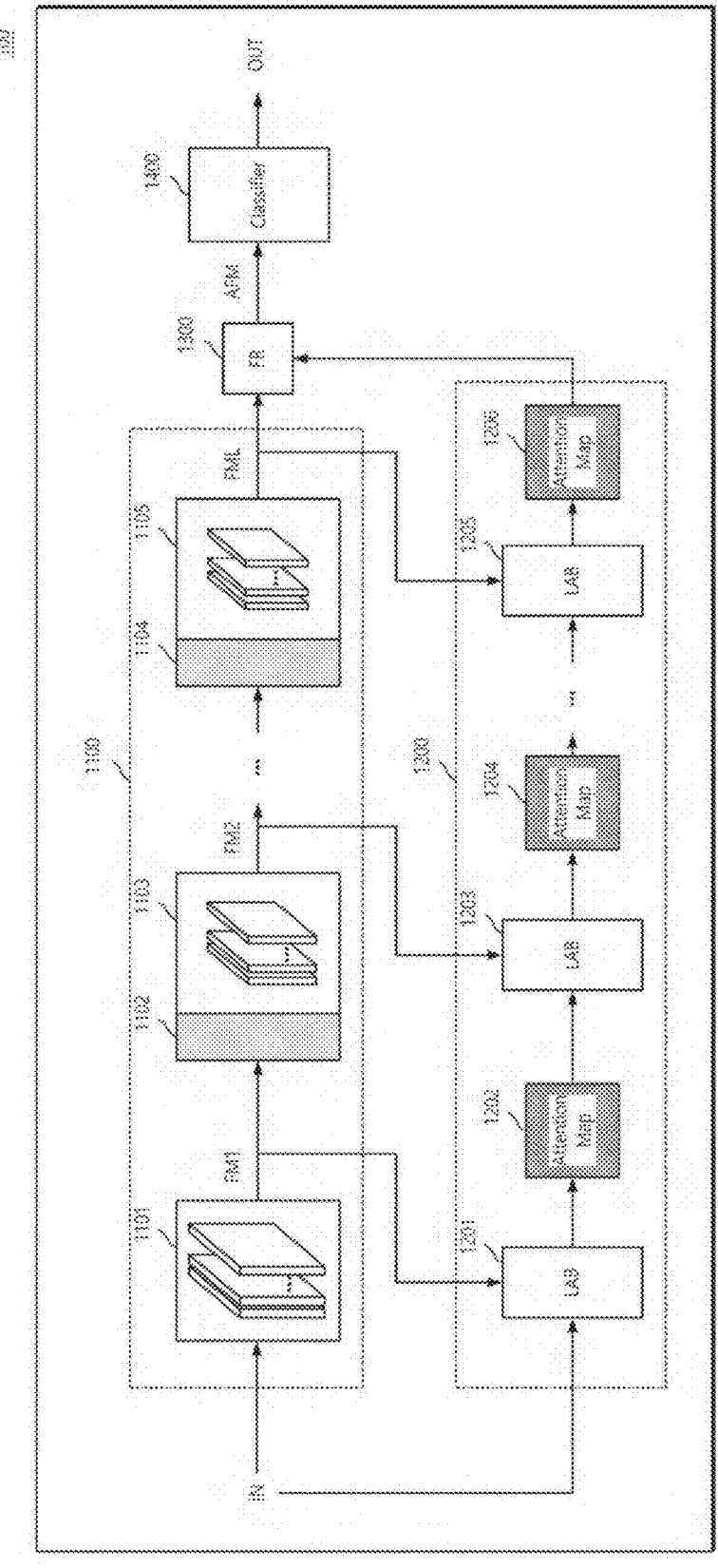
FIG. 1 is a diagram illustrating an operating method of an electronic device according to an embodiment of the present disclosure.

FIG. 1 is a diagram illustrating an operating method of an electronic device according to an embodiment of the present disclosure.

Referring to FIG. 1, an electronic device 100 according to an embodiment may receive input data IN and operate to classify or recognize at least one object included in the input data IN.

In an embodiment, the input data IN may be a satellite image including at least one object. For example, a satellite image may be taken and collected from very high altitude viewing angles, such as bird-eye view angles. Accordingly, the satellite image may have characteristics that the object has a relatively high correlation with the background and that the size of the object is relatively very small compared to the background. The electronic device 100 according to an embodiment of the present disclosure may classify or recognize an object by considering the characteristics of the satellite image.

The electronic device 100 may input the input data IN including the above-described satellite image and the like to a first artificial intelligence model 1100 and a second artificial intelligence model 1200 that have different branch points.

As an embodiment, the first artificial intelligence model 1100 may have a convolutional neural network structure. Specifically, the first artificial intelligence model 1100 may include a plurality of convolution blocks 1101, 1103, and 1105 sequentially and continuously connected. In addition, each convolution block may include an activation function. Each of the plurality of convolution blocks 1101, 1103, and 1105 may include a plurality of convolution layers. When the number of convolution blocks 1101, 1103, and 1105 is 'L' (where 'L' is a natural number), the size of each convolution block may be $C^i \times H^i \times W^i$, where 'i' may be defined as an index indicating which block is located among the L convolution blocks, '$C^i$' may be defined as the number of channels, '$H^i$' may be defined as a spatial dimension of height, and '$W^i$' may be defined as a spatial dimension of width. For example, the plurality of convolution blocks 1101, 1103 and 1105 may be configured to have a pyramidal structure in which the size of the convolution block decreases as the convolution block is further away from an input stage to which the input data IN is input.

The electronic device 100 may obtain a plurality of feature maps FM1, FM2, . . . , and FML output from each of the plurality of convolution blocks 1101, 1103 and 1105. The plurality of feature maps may be referred to as FM1, FM2 and FML without loss of generality. Each feature map may have the same size as the convolution block which outputs the feature map. The feature map output from each convolution block may be defined by following Equation 1.

$$A(\Theta; x) = \left\{ A^i(\Theta; x) \right\}_{i=1}^{L} \qquad \text{[Equation 1]}$$

Where '$\Theta$' may be defined as a set of learnable parameters of the first artificial intelligence model 1100, 'x' may be input data IN, and $A(\Theta; x)$ may be a feature map. Among the feature maps defined according to Equation 1, the i-th feature map FMi may be defined as $A^i(x)$. In addition, in the equations mentioned in the present specification below, definitions of equations that overlap each other may be omitted.

The plurality of convolution blocks 1101, 1103, . . . , and 1105 may be connected to each other while interposing pooling layers 1102 and 1104 therebetween. The feature map output from each convolution block may be compressed for its spatial dimension size through the pooling layers 1102 and 1104 before being input to the next convolution block. Through the pooling layers 1102 and 1104, the operation efficiency of the entire first artificial intelligence model 1100 may be improved.

The electronic device 100 may obtain the feature maps FM1, FM2, and FML output for each convolution block by inputting the input data IN to the first artificial intelligence model 1100. When branch points between the plurality of convolution blocks 1101, 1103 and 1105 included in the first artificial intelligence model 1100 are referred to as first branch points, the electronic device 100 may input each feature map FM1, FM2, and FML to the second artificial intelligence model 1200 through each first branch point. In addition, the feature map FML output from the last convolution block may be input to a classifier 1400 (which may be referred to as a predictor) connected to the output stage of the first artificial intelligence model 1100.

As described above, the first artificial intelligence model 1100 may extract features of the input data IN through a convolutional neural network structure, and in particular, the plurality of convolution blocks 1101, 1103, . . . , and 1105 has a structure where the convolution blocks are sequentially connected. Accordingly, the electronic device 100 may extract each feature map that is extracted step by step from the branch point of each convolution block. In that features for object recognition are extracted from the input data IN, the first artificial intelligence model 1100 may be referred to as a perception model.

The second artificial intelligence model 1200 may include a plurality of local attention blocks 1201, 1203, and 1205 which are sequentially connected. The plurality of local attention blocks may be referred to as 1201, 1203 and 1205 without loss of generality. Each local attention block may be configured to output attention maps 1202, 1204, . . . , and 1206 from the input data IN. In general, there may be L attention maps. The plurality of output attention maps may be referred to as 1202, 1204 and 1206 without loss of generality. The attention map is data that is extracted for learning while weighting a specific part, rather than referring to the input data IN at the same rate. For example, in the case of a satellite image, an attention map may be used to emphasize a part corresponding to an object in the satellite image.

Each pixel value of the attention map indicates a degree of importance at which the local attention block considers in the feature map. Whenever an attention map is sequentially transmitted to a local attention block, the next local attention block may operate with more focus on a region focused on in the transmitted attention map.

The plurality of local attention blocks 1201, 1203, and 1205 may include a convolution layer and/or an activation function like the first artificial intelligence model 1100, and may have a pyramidal structure in which the size of the spatial dimension of each block decreases as the block is further away from the input stage.

As an embodiment, the electronic device 100 may input a feature map from the first branch point of the first artificial intelligence model 1100 to each local attention block. In other words, each of the plurality of feature maps FM1, FM2, and FML may be sequentially input to each of the plurality of local attention blocks 1201, 1203, and 1205. For example, the first local attention block 1201 may receive the feature map FM1 output from the first convolution block 1101. To this end, according to an embodiment, the number of local attention blocks 1201, 1203, and 1205 may be 'L' that is equal to the number of convolution blocks 1101, 1103, and 1105.

When the plurality of local attention blocks 1201, 1203, and 1205 included in the second artificial intelligence model 1200 are referred to as second branch points, the electronic device 100 may input each feature map extracted through each first branch point to the second artificial intelligence model 1200 through each second branch point.

Therefore, each local attention block is configured to output the i-th attention map while receiving the (i−1)-th attention map, which is the output of the local attention block located in the previous stage, and the i-th feature map FMi input from the first branch point as inputs. The electronic device 100 may output the i-th attention map to which visual explanation is reflected for the i-th feature map FMi, through each local attention block by using the (i−1)-th attention map that is the output of the local attention block located in the previous stage.

As a result, the second artificial intelligence model 1200 may finally output an attention map to which all information on a region emphasized in the input data IN is reflected while transmitting the attention map sequentially generated from the input stage to each local attention block.

The attention map obtained from each local attention block may be data in which a specific region is emphasized in the input data IN. Because emphasis on a specific region is visually performed when the input data IN is an image, it may be referred to as a visual explanation, so that the attention map may also be referred to as a visual explanation map.

According to the above-described embodiments, the electronic device 100 may obtain the L-th feature map FML that is the last feature map output from the last convolution block 1105 through the first artificial intelligence model 1100, and obtain the L-th attention map 1206, which is the last attention map output from the last local attention block 1205 through the second artificial intelligence model 1200.

The electronic device 100 may perform feature refinement 1300 based on the L-th feature map FML and the L-th attention map 1206. The feature refinement 1300 may mean amplifying a region corresponding to the L-th attention map 1206 in the L-th feature map FML and outputting an amplified feature map AFM. As a result, the amplified feature map AFM may reflect a weight requiring attention extracted through the second artificial intelligence model 1200 in addition to the features extracted through the first artificial intelligence model 1100.

The electronic device 100 may input the amplified feature map AFM to the classifier 1400 and output a classification result OUT for the input data IN. The classification result OUT may be $p^c(\Theta; x)$ that is confidence for each class of the input data IN. For example, when the input data IN is a satellite image, the class may correspond to the type of each object included in the satellite image.

The electronic device 100 may train the first artificial intelligence model 1100 and the second artificial intelligence model 1200 above-described based on a loss function. The loss function may be defined based on the classification result OUT. For example, when the training data set for learning is defined as 'x', the label set for the training data as 'y', and the batch of the training data set may be defined as $\zeta=(\mathcal{X}, \mathcal{Y})$, the loss function for learning may defined as following Equation 2.

$$\mathcal{L}(\Theta; \zeta) = -\frac{1}{|\zeta|} \sum_{(x,y)\in\zeta} \sum_{j=1}^{K} 1[y = j]\log\!\left(p^j(\Theta; x)\right) \qquad \text{[Equation 2]}$$

Where $\mathcal{L}(\Theta; \zeta)$ is a loss function, $1[y=j]$ is a function that outputs '1' only when 'y' is 'j' and outputs '0' otherwise, and 'K' is the total number of classes in the training data set.

The electronic device 100 may train the first artificial intelligence model 1100 and the second artificial intelligence model 1200 based on the loss function defined according to Equation 2. The electronic device 100 may classify or recognize at least one object included in the input data IN by inputting the input data IN to the first artificial intelligence model 1100 and the second artificial intelligence model 1200.

According to embodiments of the present disclosure, the electronic device 100 may accurately detect an object or an important feature in the input data IN having a characteristic of a small size of an object, such as a satellite image, thereby improving object classification or recognition performance. In particular, according to the embodiments of the present disclosure, the feature map may be extracted from each branch point of the first artificial intelligence model 1100 that extracts semantic information of the input data IN, and the attention map may be extracted by inputting the weight information of a specific area to each branch point of the second artificial intelligence model 1200, so that it is possible to solve a background bias.

Figure 2:
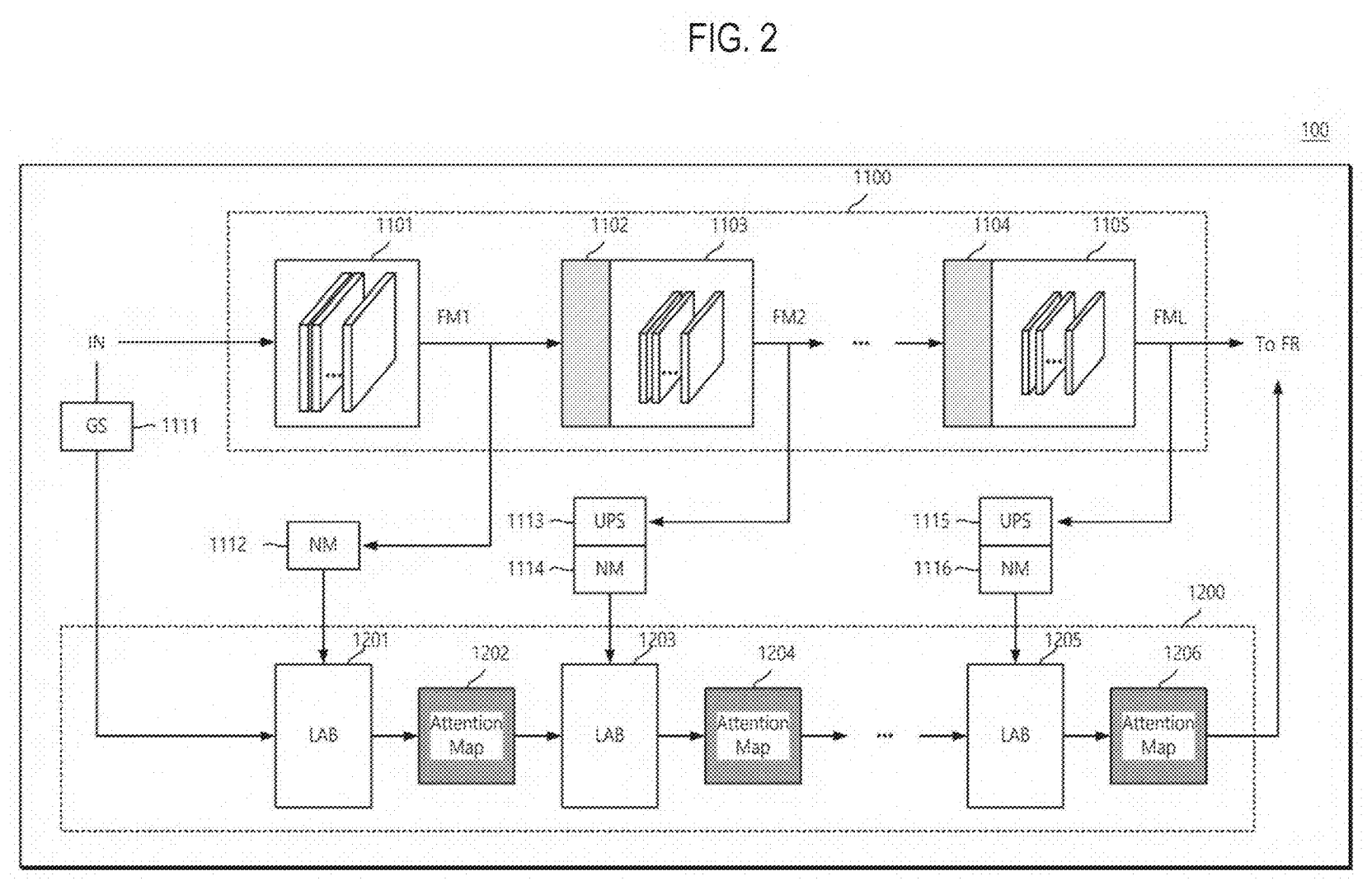

FIG. 2 is a diagram illustrating in more detail an operating method of an electronic device according to an embodiment of the present disclosure.

Referring to FIG. 2, the electronic device 100 according to an embodiment may perform gray scale 1111 on the input data IN when the input data IN is input to the second artificial intelligence model 1200. Then, the gray-scaled gray conversion data GS_IN may be input to the local attention block 1201 located at the input stage among the plurality of local attention blocks 1201, 1203 and 1205.

As described above, a feature map may be input to each local attention block from each first branch point of the first artificial intelligence model 1100, and the electronic device 100 may perform up-sampling 1113 and 1115 or normalization 1112, 1114 and 1116 when the feature map is input.

In an embodiment, when the initial feature map FM1, which is output first among the plurality of feature maps FM1, FM2, and FML, is input to the first local attention block 1201 which is a first local attention block located first among the plurality of local attention blocks 1201, 1203, and 1205, the electronic device 100 may normalize the initial feature map FM1 and input the normalized initial feature map.

In an embodiment, when the feature maps other than the initial feature map FM1 are input to the remaining local attention blocks 1203 and 1205 except for the first local attention block 1201, the electronic device 100 may scale the spatial dimensions of the remaining feature maps through up-sampling 1113 and 1115 to be operated in the local attention block. The electronic device 100 may normalize the up-sampled remaining feature maps and input the normalized remaining feature maps to the local attention block.

Figure 3:
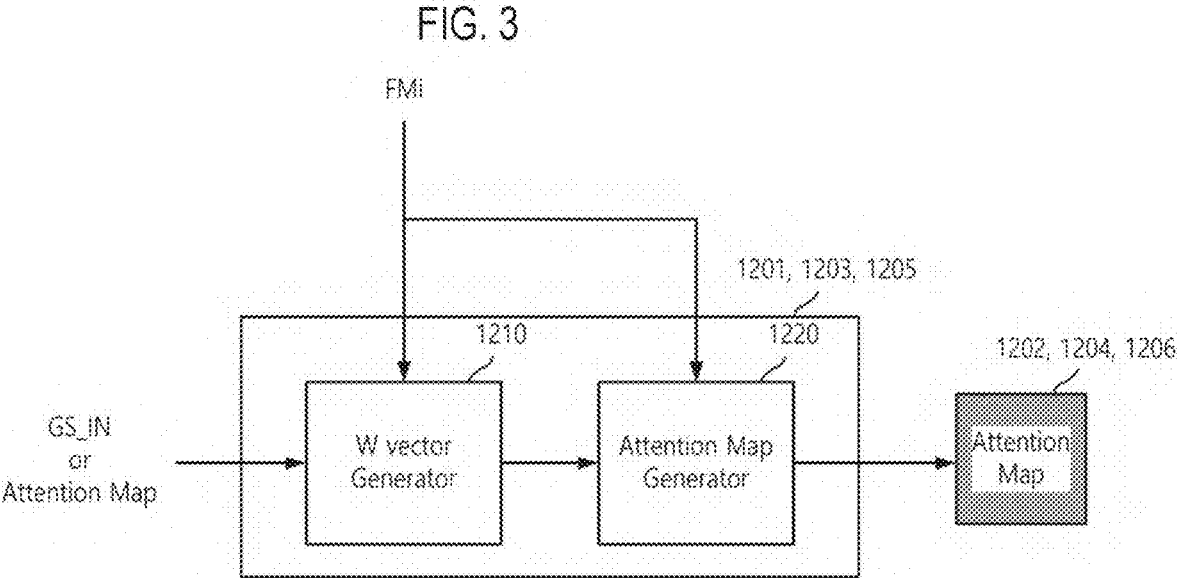
FIG. 3 is a diagram illustrating a local attention block according to an embodiment of the present disclosure.

FIG. 3 is a diagram illustrating a local attention block according to an embodiment of the present disclosure.

Referring to FIG. 3, the local attention blocks 1201, 1203, and 1205 according to an embodiment may be configured to receive the i-th feature map FMi among L feature maps and output the i-th attention map. In this case, other inputs of the local attention blocks 1201, 1203, and 1205 may be outputs of gray conversion data GS_IN or previous-stage local attention blocks 1201, 1203, and 1205 according to whether the local attention blocks 1201, 1203, and 1205 are input stages.

The local attention blocks 1201, 1203, and 1205 may include a weight vector generator 1210 and an attention map generator 1220.

The weight vector generator 1210 may generate a weight vector for each channel of a feature map.

In an embodiment, when the gray conversion data GS_IN is input to the weight vector generator 1210, the electronic device 100 may obtain a weight vector for each channel of the initial feature map FM1 based on the gray conversion data GS_IN and the initial feature map FM1.

In an embodiment, when the outputs of the previous-stage local attention blocks 1201, 1203, and 1205 are input to the weight vector generator 1210, the electronic device 100 may obtain a weight vector for each channel of a feature map based on the outputs of the previous-stage local attention blocks 1201, 1203, and 1205 and one feature map among the i-th feature map FMi which indicate the remaining feature maps other than the initial feature map FM1.

As described above, the feature map may have a $C^i$-dimensional channel, and the weight vector may be generated for each channel of the feature map. The weight vector may correspond to information on a region to be emphasized in the input data IN. For example, when a satellite image is the input data IN, the weight vector may include information about a region of at least one object included in the satellite image. In the second artificial intelligence model 1200, the closer the weight vector generator 1210 is to the output stage, that is, a higher stage, the more accurate the weight information for a region to be emphasized may be generated.

The attention map generator 1220 may generate the attention maps 1202, 1204, and 1206 based on the weight vector generated by the weight vector generator 1210. The attention map generator 1220 may receive the i-th feature map FMi and generate the i-th attention map through a weighted sum operation in which a weight vector is used as a weight in the i-th feature map FMi. The attention map generator 1220 corresponding to a higher stage in the second artificial intelligence model 1200 may accurately generate information on a region to be emphasized.

The attention map generated through the attention map generator 1220 may be obtained by visually reflecting a region to be emphasized in the feature map.

Hereinafter, examples of the local attention block will be described in more detail.

Figure 4:
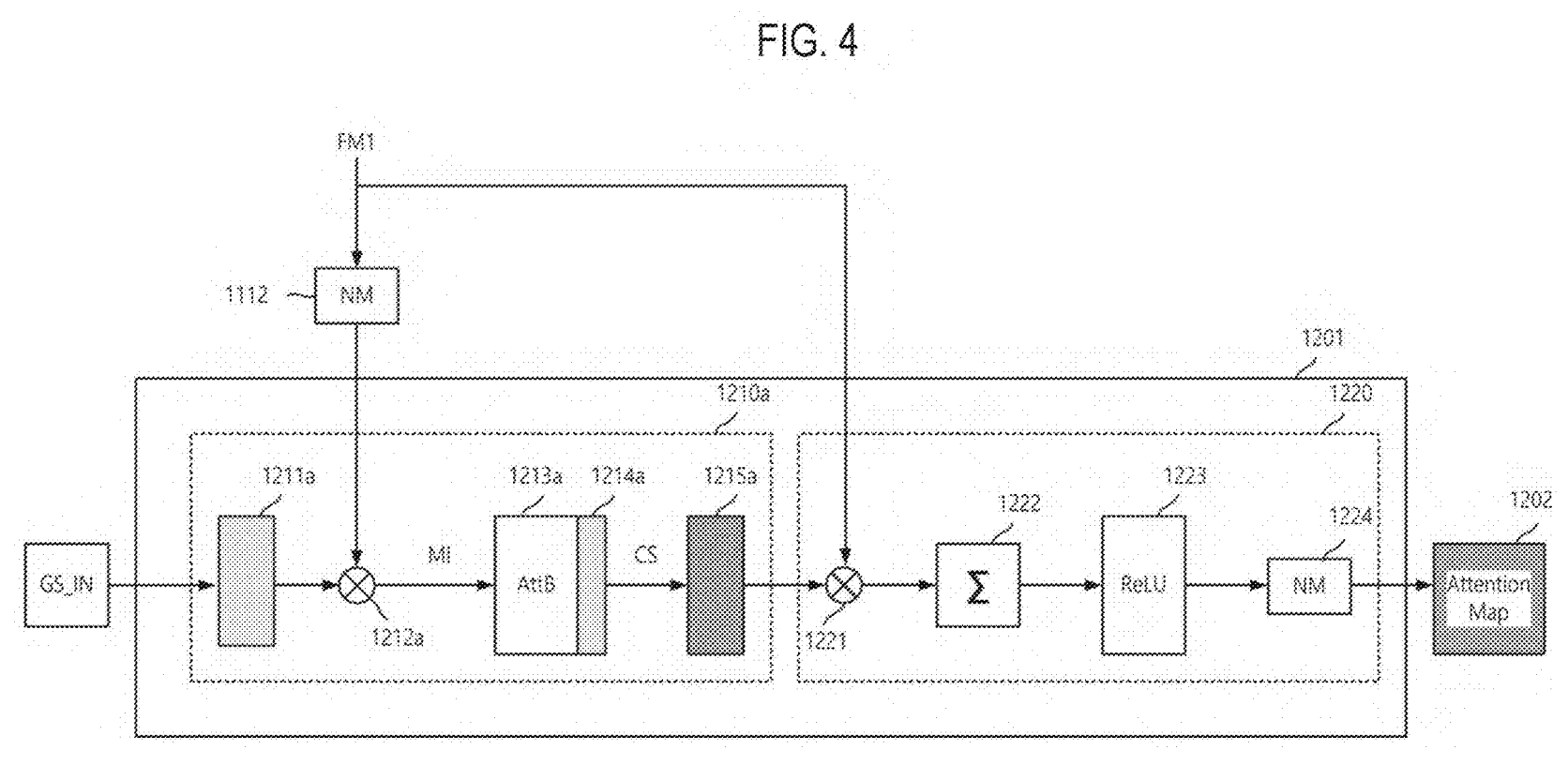

FIG. 4 is a diagram illustrating a local attention block according to an embodiment of the present disclosure.

The local attention block 1201 in FIG. 4 may be located at an input stage in the second artificial intelligence model 1200. Therefore, it may be the local attention block 1201 that operates first. A weight vector generator 1210a may receive the gray conversion data GS_IN and the initial feature map FM1 normalized through the normalization 1112 as inputs, thereby generating a weight vector.

First, the weight vector generator 1210a performs a pooling operation through a pooling layer 1211a such that the gray conversion data GS_IN operates with the initial feature map FM1, thereby matching the spatial dimension with the initial feature map FM1. The weight vector generator 1210a may perform a multiplication operation 1212a of the pooling operation result and the normalization result of the initial feature map FM1. The weight vector generator 1210a may obtain a mask input MI as a result of a multiplication operation.

Next, the weight vector generator 1210a may obtain a confidence score CS by sequentially passing the mask input MI through an attention block 1213a and a pooling layer 1214a. The attention block may include at least one convolution layer and an activation function, and may output a feature of the mask input MI from the mask input MI.

Next, the weight vector generator 1210a may finally generate a weight vector for each channel by applying a softmax function 1215a to the obtained confidence score CS.

An operation of the weight vector generator 1210a according to the above-described embodiment may be defined by following Equation 3.

$$W = AvgPool(\tilde{x}) \odot \frac{\mathcal{A}^1(x) - \min\mathcal{A}^1(x)}{\max\mathcal{A}^1(x)}, \qquad \text{[Equation 3]}$$

$$W' = AvgPool(AttB^1(W)),$$

$$W_i^1(x) = \frac{\exp(W_i')}{\sum_{j=1}^{C^1}\exp(W_j')}, \forall i = \{0, 1, \dots, C^1 - 1\}.$$

Where 'W' may be the mask input MI, $\mathcal{A}^1$ (x) may be the initial feature map FM1, $AvgPool(\tilde{x})$ may be a pooling operation for the gray conversion data GS_IN $(\tilde{x})$, $\odot$ may be a multiplication operation for each vector or matrix element (e.g. a pixel), $AttB^1$ may be an operation of the attention block 1213a included in the first local attention block 1201, which is a local attention block located first, and $$W_i^1(x)$$

may be a weight vector generated by applying the softmax function 1215a and may be a weight vector for the initial feature map FM1. The weight vector generated through the weight vector generator 1210a is transmitted to the attention map generator 1220.

The attention map generator 1220 may perform a weight sum operation on the initial feature map FM1 by using the weight vector for each channel as a weight. For example, the attention map generator 1220 may perform a multiplication operation 1221 of the initial feature map FM1 for each channel and the weight vector, and may perform a sum operation 1222 for the multiplication operation.

The attention map generator 1220 may apply an activation function 1223 to the result of the weight sum operation. Thereafter, the attention map generator 1220 may generate the attention map 1202 by normalizing 1224 the result of the activation function.

An operation of the attention map generator 1220 according to the above-described embodiment may be defined by following Equation 4.

$$M(x) = \sigma(\sum_{i=1}^{C^1} W_i^1(x)\mathcal{A}_i^1(x)),$$

$$M^1(x) = \frac{M(x) - \min M(x)}{\max M(x)},$$

[Equation 4]

Where M(x) may be defined as a result of a weight sum operation and an activation function, $C^1$ may be defined as the number of channels of the initial feature map FM1, $\sigma(\cdot)$ may be defined as a ReLU activation function, and $M^1(x)$ may be defined as the first attention map 1202 generated based on the initial feature map FM1.

Figure 5:
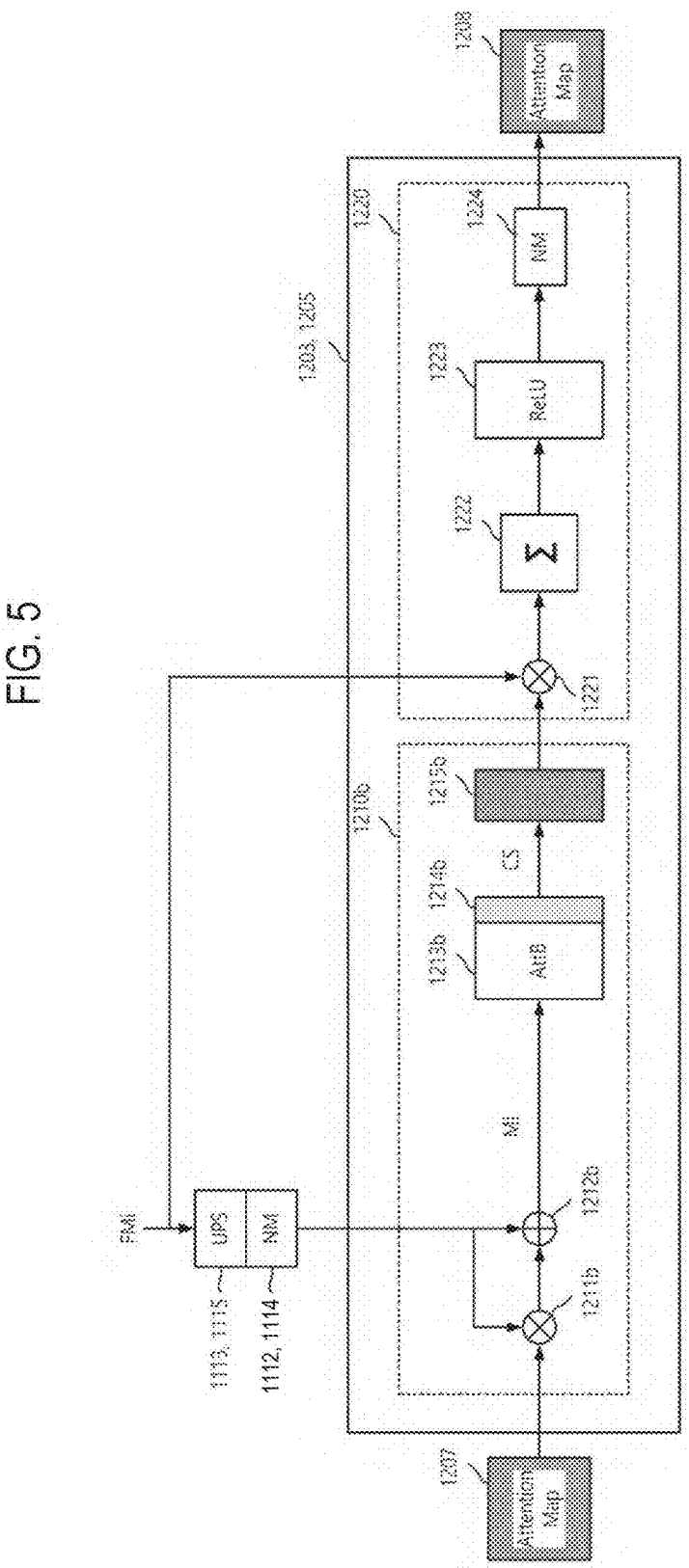
FIG. 5 is a diagram illustrating a local attention block according to another embodiment of the present disclosure.

FIG. 5 is a diagram illustrating a local attention block according to another embodiment of the present disclosure.

The local attention blocks 1203 and 1205 according to FIG. 5 may be local attention blocks 1203 and 1205 other than the first local attention block 1201 in the second artificial intelligence model 1200.

A weight vector generator 1210b may receive the results of up-sampling 1113 and 1115 and normalization 1102 and 1104 of the remaining feature maps except for the initial feature map FM1, and then, receive an output of another local attention block 1207 that operates before the corresponding local attention block. Unlike the first local attention block 1201 located at the input stage, the weight vector generator 1210b receives the (i−1)-th attention map, which is the attention map output from the previous stage, and the generated mask input MI is also different. The weight vector generator 1210b performs the sum operation 1212b of the up-sampled 1113 and 1115 and normalized feature map and the result of the multiplication operation 1211b of the normalized feature map and the (i−1)-th attention map 1207, thereby generating the mask input MI.

An operation of the weight vector generator 1210b according to the above-described embodiment may be defined by following Equation 5.

$$W = \left(1 + M^{i-1}(x)\right) \odot \frac{\mathcal{A}^i(x) - \min\mathcal{A}^i(x)}{\max\mathcal{A}^i(x)},$$

[Equation 5]

$$\forall i = \{2, 3, \ldots, L\}.$$

Where $M^{i-1}(x)$ may be defined as the (i−1)-th attention map 1207.

Thereafter, as in FIG. 4, the weight vector generator 1210b may obtain a confidence score CS by sequentially passing the mask input MI through an attention block 1213b and a pooling layer 1214b. Next, the weight vector generator

1210b may finally generate a weight vector for each channel by applying a softmax function 1215b to the obtained confidence score CS.

Thereafter, the attention map generator 1220 may perform a weight sum operation on the i-th feature map FMi by using the weight vector for each channel as a weight. For example, the attention map generator 1220 may perform the multiplication operation 1221 of the i-th feature map FMi and the weight vector for each channel, and may perform the sum operation 1222 for the multiplication operation.

The attention map generator 1220 may apply the activation function 1223 to the result of the weight sum operation. Thereafter, the attention map generator 1220 may generate an i-th attention map 1208 by normalizing 1224 the result of the activation function.

According to the above-described embodiments, the electronic device 100 may finally obtain the last attention map $M^L(x)$ from the L-th local attention block 1205 while sequentially generating the attention map through the plurality of local attention blocks 1201, 1203 and 1205 included in the second artificial intelligence model 1200. The last attention map 1206 may be obtained by sequentially passing through local attention blocks and reflecting all the information on the regions emphasized in each block.

According to the above-described embodiments, before each feature map output from each branch point of the first artificial intelligence model 1100 passes through the pooling layer, the electronic device 100 of the present disclosure may input each feature map to each local attention block of the second artificial intelligence model 1200, thereby obtaining the attention map from each local attention block. Accordingly, because each local attention block generates an attention map by using a feature map in which information loss before a pooling operation is minimized, background bias may be eliminated.

FIG. 6 is a diagram illustrating a feature refinement operation according to an embodiment of the present disclosure.

Referring to FIG. 6, the electronic device 100 may obtain $A^L(x)$ that is the last feature map obtained from the L-th convolution block 1105 of the first artificial intelligence model 1100, and obtain $M^L(x)$ that is the last attention map 1206 from the L-th local attention block. The electronic device 100 may output the amplified feature map AFM by performing a sum operation 1310 of the last feature map 1105 and the result of multiplying 1320 the last feature map by the last attention map 1206. The output amplified feature map AFM may be obtained by amplifying data corresponding to a region emphasized by the attention map. The multiplication operation 1320 may be performed for each element of a vector or matrix.

An operation of the feature refinement 1300 according to the above-described embodiment may be defined by following Equation 6.

$$\tilde{A}^L(x) = \left(1 + M^L(x)\right) \odot A^L(x).$$

[Equation 6]

Where $\tilde{A}^L(x)$ may be defined as an amplified feature map AFM.

The electronic device 100 may transmit the amplified feature map AFM to the classifier 1400.

The electronic device 100 may obtain the weight vector for each channel of one feature map based on the output of another local attention block, which operates before the one local attention block through the one local attention block corresponding to the one convolution block among the plurality of local attention blocks 1201, 1203 and 1205, and the normalization result of the one feature map.

FIG. 7 is a flowchart illustrating an operating method of an electronic device according to an embodiment of the present disclosure.

Referring to FIG. 7, in operation S1010, the electronic device 100 may input the input data IN to the first artificial intelligence model 1100 including the plurality of convolution blocks 1101, 1103 and 1105 sequentially connected with a pooling layer interposed therebetween. For example, the input data IN may be a satellite image including at least one object.

In operation S1020, the electronic device 100 may obtain the plurality of feature maps FM1, FM2, and FML output from each of the plurality of convolution blocks 1101, 1103, and 1105.

In operation S1030, the electronic device 100 may input the input data IN and the plurality of feature maps FM1, FM2, and FML to the second artificial intelligence model 1200 including the plurality of local attention blocks 1201, 1203, and 1205 sequentially connected. In this case, the electronic device 100 may sequentially input each of the plurality of feature maps FM1, FM2, and FML to each of the plurality of local attention blocks 1201, 1203, and 1205. For example, the i-th feature map FMi output from the i-th convolution block may be input to the i-th local attention block. In addition, the input data IN may be input as gray-scaled gray conversion data GS_IN.

In operation S1040, the electronic device 100 may obtain the plurality of attention maps 1202, 1204, and 1206 output from each of the plurality of local attention blocks 1201, 1203 and 1205. Based on one local attention block, the attention map obtained from the previous local attention block may be used as an input of one local attention block, and accordingly, the attention map may be sequentially processed through the local attention block.

In operation S1050, the electronic device 100 may amplify a region corresponding to the last attention map among the plurality of attention maps 1202, 1204, and 1206 in the last feature map among the plurality of feature maps FM1, FM2, and FML, thereby outputting the amplified feature map AFM.

In operation S1060, the electronic device 100 may input the amplified feature map AFM to the classifier 1400 and output the classification result OUT for the input data IN.

In addition, the electronic device 100 may further include an operation of training the first artificial intelligence model 1100 and the second artificial intelligence model 1200 according to a loss function defined based on the classification result OUT. In this case, the loss function may be defined based on Equation 2.

FIG. 8 is a flowchart illustrating a weight vector operation according to an embodiment of the present disclosure.

Referring to FIG. 8, the electronic device 100 may perform operations S1110a and S1120a through the first local attention block 1201.

In operation S1110a, the electronic device 100 may perform a pooling operation on the gray conversion data GS_IN of the input data IN.

In operation S1120a, the electronic device 100 may obtain the weight vector for each channel of the initial feature map FM1 based on the pooling operation result and the normalization result of the initial feature map FM1 output first among the plurality of feature maps FM1, FM2, and FML. Operation S1120a may be performed through Equation 3.

Alternatively, the electronic device 100 may perform operations S1110b and S1120b through one of the remaining local attention blocks 1203 and 1205 except for the first local attention block 1201.

In operation S1110b, the electronic device 100 may normalize one feature map output from one of the plurality of convolution blocks 1101, 1103, and 1105.

In operation S1120b, the electronic device 100 may obtain the weight vector for each channel of the one feature map based on the output of another local attention block that operates before one local attention block among the plurality of local attention blocks 1201, 1203 and 1205 and the normalization result of one feature map.

FIG. 9 is a flowchart illustrating an attention map generation operation according to an embodiment of the present disclosure.

Referring to FIG. 9, after performing operation S1120a or operation S1120b, the electronic device 100 may perform a weight sum operation on one feature map by using the weight vector for each channel as a weight in operation S1130. The weight sum operation may be performed for each channel of the feature map.

In operation S1140, the electronic device 100 may obtain one attention map corresponding to the output of one local attention block by applying an activation function to the result of the weight sum operation.

FIG. 10 is a diagram illustrating an electronic device according to an embodiment of the present disclosure.

Referring to FIG. 10, the electronic device 100 according to an embodiment includes a memory 110 and a processor 120.

The memory 110 may be connected to the processor 120 and may store various information related to the operation of the processor 120. For example, the memory 110 may store software codes including at least one instruction for performing all or some of the processes controlled by the processor 120 or performing the descriptions, functions, procedures, suggestions, methods, and/or operational flowcharts of the present disclosure.

The processor 120 may be configured to control the memory 110 and execute at least one instruction stored in the memory 110, thereby implementing the descriptions, functions, procedures, suggestions, methods and/or operational flowcharts of the present disclosure. In addition, the processor 120 may provide operations according to various examples of the present disclosure based on the instructions stored in the memory 110. In addition, the processor 120 may process information stored in the memory 110 to generate data.

In an embodiment, the processor 120 may input the input data IN to the first artificial intelligence model 1100 including the plurality of convolution blocks 1101, 1103, and 1105 sequentially connected with a pooling layer interposed therebetween, and may obtain the plurality of feature maps FM1, FM2, and FML output from each of the plurality of convolution blocks 1101, 1103, and 1105.

The processor 120 may input the input data IN and the plurality of feature maps FM1, FM2, and FML to the second artificial intelligence model 1200 including the plurality of local attention blocks 1201, 1203, and 1205 sequentially connected, and may obtain the plurality of attention maps 1202, 1204, and 1206 output from each of the plurality of local attention blocks 1201, 1203, and 1205.

The processor 120 may amplify the region corresponding to the last attention map among the plurality of attention maps 1202, 1204, and 1206 in the last feature map among the plurality of feature maps FM1, FM2, and FML to output the amplified feature map AFM, and may input the amplified feature map AFM to the classifier 1400 to output the classification result OUT for the input data IN.

The processor 120 may train the first artificial intelligence model 1100 and the second artificial intelligence model 1200 according to a loss function defined based on the classification result OUT. The trained first artificial intelligence model 1100 and the second artificial intelligence model 1200 may be stored in the memory 110.

Hereinafter, a satellite system operating in conjunction with the electronic device 100 according to the above-described embodiments and a terrestrial node 20 included in the satellite system will be described. Detailed descriptions of overlapping parts with the above may be omitted.

FIG. 11 is a diagram illustrating a satellite system according to an embodiment of the present disclosure.

Referring to FIG. 11, a satellite system according to an embodiment may include a satellite node 10 and the terrestrial node 20. A plurality of satellite nodes 10 and terrestrial nodes 20 may be provided.

The satellite node 10 may include the electronic device 100 according to the above-described embodiments, and a camera 200 and a transceiver 300 connected to the electronic device 100.

The camera 200 may photograph a still image and a moving image. According to an embodiment, the camera 200 may include one or more lenses, image sensors, image signal processors, a flash, or the like. The camera 200 may capture and collect satellite images shown in a bird-eye view. The electronic device 100 may utilize the collected satellite images as the input data IN.

The transceiver 300 may transmit and/or receive wired/wireless signals or data under control of the electronic device 100. For example, the satellite node 10 may exchange signals or data with the terrestrial node 20 through transceiver 300.

In an embodiment, the transceiver 300 may transmit the plurality of attention maps 1202, 1204, and 1206 output through the electronic device 100 and/or the plurality of feature maps FM1, FM2, and FML to the terrestrial node 20, or may receive updated model parameters from the terrestrial node 20.

According to the above-described embodiments, the electronic device 100 may obtain the input data IN corresponding to a satellite image including at least one object through the camera 200, and may output the classification result OUT for the input data IN based on the first artificial intelligence model 1100 including the plurality of convolution blocks 1101, 1103, and 1105 sequentially connected with a pooling layer interposed therebetween and the second artificial intelligence model 1200 including the plurality of local attention blocks 1201, 1203, and 1205 sequentially connected.

The terrestrial node 20 may receive the input data IN from the satellite node 10, and retrain a first artificial intelligence model 231 and a second artificial intelligence model 232 according to the classification result OUT of a classifier 233. In addition, the terrestrial node 20 may update model parameters according to retraining to the satellite node 10.

The terrestrial node 20 may be a base station or a terminal. The base station may be referred to as an 'access point (AP)', 'next generation node B (gNB)', '5G node', 'wireless point', 'transmission/reception point (TRP)', or another term having an equivalent technical meaning. The terminal may be referred to as 'user equipment (UE)', 'mobile station', 'subscriber station', 'remote terminal', 'wireless terminal', or another term having an equivalent technical meaning.

Hereinafter, the operation of the terrestrial node 20 will be described in detail.

FIG. 12 is a diagram illustrating the operation of a terrestrial node according to an embodiment of the present disclosure.

Referring to FIG. 12, the terrestrial node 20 according to an embodiment may include an inconsistent explanation sample (IES) selector 210 and a weak supervision trainer 230.

First, the IES selector 210 may receive the plurality of attention maps 1202, 1204, and 1206 generated from the satellite node 10. The IES selector 210 may arbitrarily select a pair of attention maps from among the plurality of attention maps 1202, 1204, and 1206. The pair of selected attention map may be $VE^1(x)$, $VE^2(x)$. As described above, because the attention map can also be referred to as a visual explanation map in which visual explanation is reflected, one selected attention map will be referred to as VE(x) for convenience.

The IES selector 210 may select a common region from the pair of selected attention maps. As an example, the IES selector 210 may select a pixel having a pixel value other than '0' among pixels included in the pair of attention maps as a common region. First, the IES selector 210 may determine that pixels having a pixel value close to '0' among pixels of each attention map included in the pair of attention maps are relatively meaningless regions and may filter them. A pair of filtered attention maps may be defined as $\overline{VE}^1(x)$, $\overline{VE}^2(x)$. In this case, when the index of each pixel is (i,j), the pixel value of the pair of attention maps may be defined as $$\overline{VE}^1_{ij}(x),\ \overline{VE}^2_{ij}(x).$$

Next, the IES selector 210 may extract, as a common region, a region in which pixel values are not all '0' in two attention maps included in the pair of attention maps. The common region may be defined by following Equation 7.

$$S = \left\{(i, j)\,\middle|\,\overline{VE}^1_{ij}(x) \neq 0 \vee \overline{VE}^2_{ij}(x) \neq 0\right\}. \qquad \text{[Equation 7]}$$

Where 'S' is a common region and may mean a set of pixel values in which both attention maps are not '0'.

The IES selector 210 may calculate a similarity between two attention maps for a common region based on following Equation 8.

$$SIM\left(VE^1(x),\ VE^2(x)\right) = \frac{\sum_{(i,j)\in S}\left\{1 - \left|\overline{VE}^1_{ij}(x) - \overline{VE}^2_{ij}(x)\right|\right\}}{\text{area}(S)}, \qquad \text{[Equation 8]}$$

Where SIM( ) may be defined as a similarity value between two attention maps, 's' may be defined as a set of pixels whose pixel value is not 0 among two attention maps, and area (S) may be defined as the number of pixels in the common region S.

The IES selector 210 may calculate dissimilarity for a pair of attention maps based on the calculated similarity. For example, the IES selector 210 may calculate dissimilarity based on following Equation 9.

$$u\left(VE^1(x),\ VE^2(x)\right) = 1 - SIM\left(VE^1(x),\ VE^2(x)\right). \qquad \text{[Equation 9]}$$

Where $\mathcal{U}$ $(VE^1(x),\ VE^2(x))$ may be defined as a dissimilarity value for a pair of attention maps.

As a result, the IES selector 210 may extract a common region from the attention map pair and calculate the dissimilarity for the attention map pair based on the pixel value of the common region.

The IES selector 210 may compare the calculated dissimilarity with a preset threshold value. When the dissimilarity exceeds the preset threshold value, it may be determined that inconsistency has occurred in the pair of attention maps for which the corresponding dissimilarity is calculated, so that it is possible to select the corresponding attention map pair as the input data 220 for retraining. The IES selector 210 may configure the input data 220 for retraining by selecting a pair of attention maps determined to have inconsistency with respect to all L attention maps according to the above-described embodiments. Ñ retraining input data 220 may be defined as $$D_u = (x,\ y)_{i=1}^{\hat{N}}.$$

A series of embodiments constituting the above-described input data 220 for retraining may be defined as active learning.

The input data 220 for retraining may be transmitted to the weak supervision trainer 230.

The weak supervision trainer 230 may use the retraining input data 220 as training data, and according to the retraining loss function defined for retraining, may train the first artificial intelligence model 231 and the second artificial intelligence model 232. The first artificial intelligence model 231 and the second artificial intelligence model 232 trained by the weak supervision trainer 230 may have the same structure as the first artificial intelligence model 1100 and the second artificial intelligence model 1200 of the satellite node 10 and the electronic device 100 according to the above-described embodiments.

A retraining loss function 240 for retraining may be defined based on the labeling scores for the plurality of attention maps 1202, 1204, and 1206. FIG. 11 illustrates that labeling of the plurality of attention maps 1202, 1204, and 1206 is performed by a supervisor, but the embodiment is not limited thereto. For example, when labeled by a supervisor as shown in FIG. 11, each attention map may be labeled as one of 'correct' or 'wrong'. When there are multiple supervisors, for example, supervisor 1, supervisor 2 and supervisor 3 as shown in item 30 of FIG. 11 providing, respectively label 1, label 2 and label 3, and a majority of supervisors label the i-th attention map of the input data IN as 'correct', the labeling score $\overset{\sim i}{\mathcal{G}}$ (x) may be '1', and when labeled as 'incorrect', the labeling score $\overset{\sim i}{\mathcal{G}}$ (x) may be '0'.

Alternatively, unlike FIG. 11, labeling may be performed through a separate labeling algorithm or another artificial intelligence model for labeling.

The terrestrial node 20 may receive a labeling score from another terrestrial node 20.

The attention map may be normalized based on the labeling score. For example, the attention map may be normalized based on following Equation 10.

$$\frac{1}{Q}\sum_{j=1}^{L}\sum_{k=1}^{L}\left\|1\left[\overline{\mathcal{G}}^j(x) = 0\right]M^j(x) - 1\left[\overline{\mathcal{G}}^k(x) = 1\right]M^k(x)\right\|_2^2, \qquad \text{[Equation 10]}$$

Where 'Q' may be defined as the number of attention maps labeled as 'wrong'. As may be understood from the definition, Equation 10 may be based on the Euclidean distance.

The loss function 240 for retraining may be defined by Equation 11 based on the input data 220 for retraining and the regularization term defined by Equation 10.

$$\mathcal{L}_{ref}(\mathcal{D}_U) = -\frac{1}{\hat{N}}\left\{\sum_{i=1}^{\hat{N}}\mathcal{L}(x_i,\ y_i) + \right.$$

$$\left. \alpha\frac{1}{Q}\sum_{j=1}^{L}\sum_{k=1}^{L}\left\|1\left[\overline{\mathcal{G}}^j(x_i) = 0\right]M^j(x_i) - 1\left[\overline{\mathcal{G}}^k(x_i) = 1\right]M^k(x_i)\right\|_2^2\right\}, \qquad \text{[Equation 11]}$$

Where $\mathcal{L}_{ref}(\mathcal{D}_U)$ may be defined as a loss function for relearning 240, $\mathcal{L}$ $(x_i,\ y_i)$ may be defined as a loss function (e.g., Equation 2) defined on the side of the satellite node 10, and '$\alpha$' may be defined as a weight.

The weak supervision trainer 230 may retrain the first artificial intelligence model and the second artificial intelligence model based on the newly defined loss function 240 for retraining. Accordingly, the weak supervision trainer 230 may retrain the model parameters to focus more on the important region indicated by the attention map labeled as 'correct'.

The weak supervision trainer 230 may obtain model parameters of the first artificial intelligence model 231 and the second artificial intelligence model 232 according to retraining, and may transmit the model parameters to the satellite node 10. Accordingly, the satellite node 10 may update the first artificial intelligence model 1100 and the second artificial intelligence model 1200 with the received model parameters.

According to the above-described embodiments, the satellite system of the present disclosure may perform a labeling operation on an attention map in which a specific region is emphasized, so that it is possible to minimize the labeling cost of a supervisor 30. In addition, the terrestrial node 20 of the present disclosure may separately select the input data 220 for retraining that is determined to have inconsistency through active learning, so that data having inaccurate visual explanation is excluded from retraining. In addition, the performance of the artificial intelligence model of the satellite node 10 may be updated by retraining the same artificial intelligence model as the satellite node 10 based on the relearning input data 220 and the newly defined relearning loss function 240.

Figure 13:
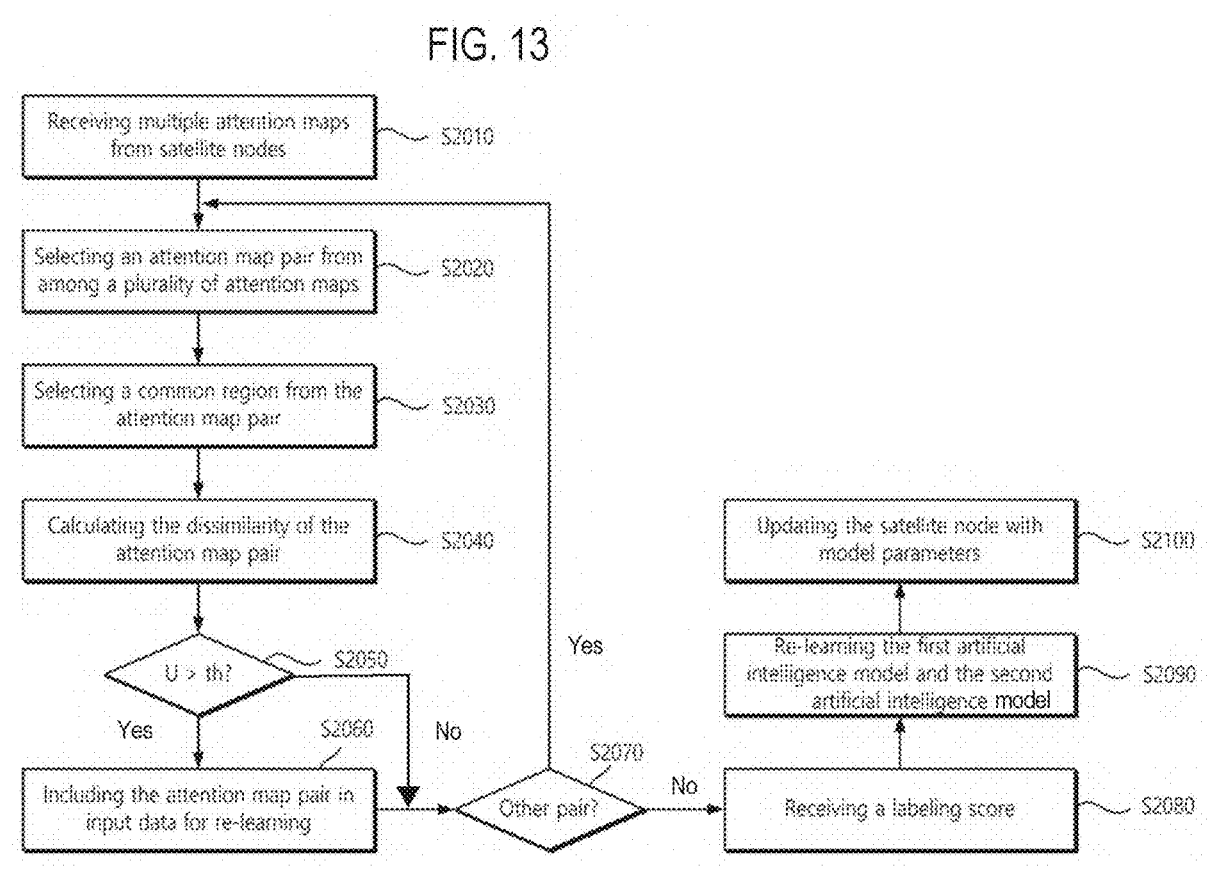

FIG. 13 is a flowchart illustrating an operating method of a terrestrial node according to an embodiment of the present disclosure.

Referring to FIG. 13, in operation S2010, the terrestrial node 20 may receive the plurality of attention maps 1202, 1204, and 1206 from the satellite node 10.

In operation S2020, the terrestrial node 20 may select a pair of attention maps from among the plurality of attention maps 1202, 1204, and 1206.

In operation S2030, the terrestrial node 20 may select a common region from the attention map pair. For example, the terrestrial node 20 may select a pixel having a pixel value other than '0' among pixels included in the pair of attention maps as a common region.

In operation S2040, the terrestrial node 20 may calculate the dissimilarity of the pair of attention maps based on the pixel value of the common region.

In operation S2050, the terrestrial node 20 may determine whether the dissimilarity exceeds a preset threshold value. If the dissimilarity exceeds the preset threshold value, the logic of FIG. 13 advances to operation S2060. If the dissimilarity does not exceed the preset threshold value, the logic of FIG. 13 advances to operation S2070.

In operation S2060, the terrestrial node 20 may include the pair of attention maps in the input data 220 for retraining when the dissimilarity of the pair of attention maps exceeds the preset threshold value.

In operation S2070, the terrestrial node 20 may determine whether another attention map pair other than the pair of currently selected attention maps exists when the dissimilarity of the pair of attention maps is equal to or less than the preset threshold value. When another attention map pair exists, the terrestrial node 20 may repeatedly perform operations S2020 to S2060, otherwise the logic advances to operation S2080.

In operation S2080, the terrestrial node 20 may receive the labeling score for the attention map when there is no other attention map pair.

In operation S2090, the terrestrial node 20 may retrain the first artificial intelligence model and the second artificial intelligence model by inputting the input data 220 for retraining based on the loss function 240 newly defined based on the labeling score.

In operation S2100, the terrestrial node 20 may update the satellite node 10 with the model parameters obtained according to retraining.

Specific embodiments have been described above. The present disclosure may include not only the above-described embodiments, but also simple design changes or easily changeable embodiments. In addition, the present disclosure may include techniques that can easily modify and implement the embodiments. Therefore, the scope of the present disclosure should not be limited to the above-described embodiments, but should be defined by the claims described below as well as the claims and equivalents.

What is claimed is:

1. An electronic device comprising:
   a memory configured to store at least one instruction; and
   at least one processor configured to execute the at least one instruction to:
   input first data to a first artificial intelligence model comprising a plurality of convolution blocks sequentially connected with a pooling layer interposed therebetween to obtain a plurality of feature maps that are output by corresponding ones of the plurality of convolution blocks,
   input the first data and the plurality of feature maps to a second artificial intelligence model comprising a plurality of local attention blocks sequentially connected to obtain a plurality of attention maps that are output by corresponding ones of the plurality of local attention blocks,
   output an amplified feature map by amplifying a region corresponding to a last attention map among the plurality of attention maps in a last feature map among the plurality of feature maps,
   input the amplified feature map to a classifier to output a classification result for the first data, perform a pooling operation on gray converted data of the first data through a local attention block that operates first among the plurality of local attention blocks, and
   obtain a weight vector for each channel of an initial feature map based on a result of the pooling operation and a normalization result of the initial feature map output first among the plurality of feature maps.

2. The electronic device of claim 1, wherein the first data comprises a satellite image including at least one object.

3. The electronic device of claim 1, wherein each of the plurality of feature maps is sequentially input to each of the plurality of local attention blocks.

4. The electronic device of claim 1, wherein the at least one processor is further configured to execute the at least one instruction to:
   normalize one feature map output from one convolution block of the plurality of convolution blocks, and
   obtain, through one local attention block corresponding to the one convolution block among the plurality of local attention blocks, a weight vector for each channel of the one feature map based on an output of another local attention block that operates before the one local attention block and a normalization result of the one feature map.

5. The electronic device of claim 4, wherein the at least one processor is further configured to execute the at least one instruction to:
   perform, through the one local attention block, a weight sum operation on the one feature map using the weight vector for each channel of the one feature map as a weight, and obtain one attention map corresponding to an output of the one local attention block by applying an activation function to a result of the weight sum operation.

6. The electronic device of claim 1, wherein the at least one processor is further configured to execute the at least one instruction to:
   output the amplified feature map by adding the last feature map and a result of multiplying the last feature map by the last attention map.

7. The electronic device of claim 1, wherein the at least one processor is further configured to execute the at least one instruction to:
   train the first artificial intelligence model and the second artificial intelligence model according to a loss function defined based on the classification result.

8. An operating method performed by an electronic device, the operating method comprising:
   inputting first data to a first artificial intelligence model comprising a plurality of convolution blocks sequentially connected with a pooling layer interposed therebetween;
   obtaining a plurality of feature maps that are output by corresponding ones of the plurality of convolution blocks;
   inputting the first data and the plurality of feature maps to a second artificial intelligence model comprising a plurality of local attention blocks sequentially connected;
   obtaining a plurality of attention maps that are output by corresponding ones of the plurality of local attention blocks;
   outputting an amplified feature map by amplifying a region corresponding to a last attention map among the plurality of attention maps in a last feature map among the plurality of feature maps;

inputting the amplified feature map to a classifier to output a classification result for the first data, performing a pooling operation on gray converted data of the first data; and obtaining a weight vector for each channel of an initial feature map based on a result of the pooling operation and a normalization result of the initial feature map output first among the plurality of feature maps.

9. The operating method of claim 8, wherein the first data includes a satellite image including at least one object.

10. The operating method of claim 8, wherein the inputting of the plurality of feature maps includes sequentially inputting each of the plurality of feature maps to each of the plurality of local attention blocks.

11. The operating method of claim 8, further comprising:

normalizing one feature map output from one convolution block of the plurality of convolution blocks; and obtaining a weight vector for each channel of the one feature map based on an output of another local attention block that operates before one local attention block of the plurality of local attention blocks and a normalization result of the one feature map.

12. The operating method of claim 11, further comprising:

performing a weight sum operation on the one feature map using the weight vector for each channel of the one feature map as a weight, and obtaining one attention map corresponding to an output of the one local attention block by applying an activation function to a result of the weight sum operation.

13. The operating method of claim 8, further comprising training the first artificial intelligence model and the second artificial intelligence model according to a loss function defined based on the classification result.

14. A satellite system comprising:

a satellite node configured to:

obtain first data corresponding to a satellite image comprising at least one object, output a classification result for the first data based on a first artificial intelligence model comprising a plurality of convolution blocks that are sequentially connected with a pooling layer interposed therebetween and a second artificial intelligence model comprising a plurality of local attention blocks sequentially connected; and a terrestrial node configured to:

retrain the first artificial intelligence model and the second artificial intelligence model and update of model parameters, based on the retraining, to the satellite node, wherein the satellite node is further configured to:

input the first data to the first artificial intelligence model to obtain a plurality of feature maps that are output by corresponding ones of the plurality of convolution blocks, input the first data and the plurality of feature maps to the second artificial intelligence model to obtain a plurality of attention maps that are output by corresponding ones of the plurality of local attention blocks, output an amplified feature map by amplifying a region corresponding to a last attention map among the plurality of attention maps in a last feature map among the plurality of feature maps, and input the amplified feature map to a classifier to output the classification result, perform a pooling operation on gray converted data of the first data through a local attention block that operates first among the plurality of local attention blocks, and obtain a weight vector for each channel of an initial feature map based on a result of the pooling operation and a normalization result of the initial feature map output first among the plurality of feature maps.

15. The satellite system of claim 14, wherein the terrestrial node is further configured to:

receive the plurality of attention maps, select a first pair of attention maps from among the plurality of attention maps, select a common region from the first pair of attention maps, determine a first dissimilarity of the first pair of attention maps based on a first pixel value of the common region, and configure input data for retraining as retraining input data comprising a second pair of attention maps having a second dissimilarity that exceeds a preset threshold among the plurality of attention maps.

16. The satellite system of claim 15, wherein the terrestrial node is further configured to retrain the first artificial intelligence model and the second artificial intelligence model based on the retraining input data as an input, based on a loss function for retraining defined based on labeling scores for the plurality of attention maps.

17. The satellite system of claim 15, wherein the terrestrial node is further configured to select a pixel having a second pixel value other than 0 (zero) among pixels included in the first pair of attention maps as the common region.

18. The satellite system of claim 14, wherein each of the plurality of feature maps is sequentially input to a corresponding one of the plurality of local attention blocks.

* * * * *